(12) United States Patent
Beinat et al.

(10) Patent No.: US 8,007,901 B2
(45) Date of Patent: Aug. 30, 2011

(54) OPTICAL ARTICLE HAVING AN ANTISTATIC, ANTIREFLECTION COATING AND METHOD OF MANUFACTURING SAME

(75) Inventors: Olivier Beinat, St. Petersburg, FL (US); Karl Klemm, St. Petersburg, FL (US); Karen West, St. Petersburg, FL (US)

(73) Assignee: Essilor International Compagnie Generale D-Optique, Charenton-le-Pont (FR)

( * ) Notice: Subject to any disclaimer, the term of this patent is extended or adjusted under 35 U.S.C. 154(b) by 1 day.

(21) Appl. No.: 11/615,198

(22) Filed: Dec. 22, 2006

(65) Prior Publication Data

US 2007/0166522 A1    Jul. 19, 2007

Related U.S. Application Data

(60) Provisional application No. 60/753,460, filed on Dec. 23, 2005.

(51) Int. Cl.
*B32B 7/02* (2006.01)

(52) U.S. Cl. ........ 428/220; 428/212; 428/432; 428/426; 428/689

(58) Field of Classification Search ................ 428/212, 428/220, 432, 426, 689
See application file for complete search history.

(56) References Cited

U.S. PATENT DOCUMENTS

| | | | | |
|---|---|---|---|---|
| 3,637,416 A * | 1/1972 | Misch et al. | ................ | 428/412 |
| 4,218,500 A * | 8/1980 | Radisch | ........................ | 428/78 |
| 5,143,796 A * | 9/1992 | Sebastiano et al. | ........... | 428/623 |
| 5,652,477 A * | 7/1997 | Tong et al. | .................... | 313/479 |
| 6,111,698 A * | 8/2000 | Woodard et al. | ............. | 359/585 |
| 6,872,649 B2 | 3/2005 | Nakamura et al. | ............. | 438/22 |
| 7,005,188 B2 * | 2/2006 | Anderson et al. | ............. | 428/432 |
| 2007/0172622 A1 | 7/2007 | Goetz et al. | ................. | 428/41.7 |

FOREIGN PATENT DOCUMENTS

| | | |
|---|---|---|
| EP | 0203730 | 12/1986 |
| EP | 1174734 | 1/2002 |
| GB | 2140581 | 11/1984 |
| WO | WO 01/55752 | 8/2001 |

* cited by examiner

*Primary Examiner* — Mark Ruthkosky
*Assistant Examiner* — Lawrence D Ferguson
(74) *Attorney, Agent, or Firm* — Fulbright & Jaworski L.L.P.

(57) ABSTRACT

An antireflection, antistatic transparent coating for an optical article, comprising at least one electrically conductive layer, wherein said electrically conductive layer contains at least one metal and has a thickness lower than or equal to 1 nm. The invention also relates to a an optical article having two main faces, at least one which being coated with the above antireflection, antistatic transparent coating and a process for depositing the above antireflection, antistatic transparent coating onto said optical article.

15 Claims, No Drawings

OPTICAL ARTICLE HAVING AN ANTISTATIC, ANTIREFLECTION COATING AND METHOD OF MANUFACTURING SAME

CROSS-REFERENCE TO RELATED APPLICATIONS

This application claims the benefit of U.S. Provisional Application No. 60/753,460 filed Dec. 23, 2005, the entire text of which is specifically incorporated by reference herein without disclaimer.

BACKGROUND OF THE INVENTION

1. Field of the Invention

The invention relates to a transparent antireflection (AR) coating having antistatic properties, an optical article coated with such coating and a method of manufacturing such optical article.

2. Description of Related Art

Organic lenses have a tendency to get charged, especially when they are cleaned in dry conditions with a cloth and consequently they may attract dusts during the time the charge remains on the lens.

It is known in the art to include at least one electrically conductive layer inside an antireflection stack in order to confer to the antireflection coated lens antistatic properties. This helps in quickly dissipating the charges.

For example, International Patent Application WO 01/55752 describes substrates coated with an AR stack including an electrically conductive layer having a sheet resistance (i.e. a surface resistivity) of $1.10^7$ to $1.10^{10}$ ohm/square. Such electrically conductive layer can be positioned at different locations of the AR stack. Practically, the conductive layer is made of a material selected from the group comprising oxides of indium, tin and zinc. Only two materials are described, indium tin oxide (ITO) and tin oxide, the preferred one being the former. The AR coating including the conductive layer can be deposited by sputtering or by vacuum evaporation deposition.

As known in the art, when depositing by vacuum evaporation the ITO layer, it is recommended to use ion assistance (IAD) in order to increase transparency. This additional step has at least two disadvantages: i) The vacuum coaters including an ion gun are more expensive; and ii) The process using IAD implies sometimes problems of reproducibility.

SUMMARY OF THE INVENTION

A first aim of this invention is to provide an optical article bearing a transparent antireflection, antistatic coating, preferably a lens, and more preferably an ophthalmic lens for eyeglasses, which would be an alternative to already known antistatic optical articles.

A second aim of this invention is to provide an optical article bearing a transparent antistatic, AR coating which does not need ion assistance to be deposited, and has at the same time a low level of luminous absorption in the visible field so as to be suitable for use in ophthalmic optics.

These problems are solved by providing an antireflection, antistatic transparent coating for an optical article, comprising at least one electrically conductive layer, wherein said electrically conductive layer contains at least one metal and has a thickness lower than or equal to 1 nm.

It is another object of the present invention to provide an optical article having two main faces, at least one which having an antireflection, antistatic transparent coating deposited thereon, said coating comprising at least one electrically conductive layer, wherein said electrically conductive layer contains at least one metal and has a thickness lower than or equal to 1 nm.

Yet another object of the present invention is a method of manufacturing the above optical article, comprising the steps of:

providing an optical article having two main faces, forming on at least one main face of said optical article an antireflection, antistatic transparent coating comprising at least one electrically conductive layer, wherein said electrically conductive layer contains at least one metal and has a thickness lower than or equal to 1 nm.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DETAILED DESCRIPTION OF THE INVENTION AND PREFERRED EMBODIMENTS

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof, such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises," "has," "contains," or "includes" one or more steps or elements possesses those one or more steps or elements, but is not limited to possessing only those one or more steps or elements.

Unless otherwise indicated, all numbers or expressions referring to quantities of ingredients, reaction conditions, etc. used herein are to be understood as modified in all instances by the term "about."

The antireflection, antistatic transparent coating for an optical article comprises, according to the invention, at least one electrically conductive layer containing at least one metal and having a thickness lower than or equal to 1 nm.

The anti-reflection coating of the present invention may include any layer or stack of layers which improves the anti-reflective properties of the finished optical article over at least one portion of the visible spectrum, thereby increasing the transmission of light and reducing surface reflectance. It is preferably a multilayer coating of dielectric materials further comprising at least one electrically conductive layer, and even better a multilayer coating comprising at least three layers of dielectric materials and at least one electrically conductive layer.

The electrically conductive layer of the invention may be located anywhere in the AR coating, provided that it does not impair significantly the anti-reflection properties of the coating. It may be the innermost layer of the AR coating, i.e., the layer of the AR coating which is the closest to the substrate of the optical article, or the outermost layer of the AR coating, i.e., the layer of the AR coating which is the furthest to the substrate of the optical article, or any inside layer of the AR coating.

Preferably, the AR coating in which the at least one electrically conductive layer is included comprises a stack of alternated layers of high refractive index (HI) and low refractive index (LI). That means the coating comprises a stack of alternated layers of high refractive index and low refractive index and at least one electrically conductive layer, said at least one electrically conductive layer being the innermost layer of the antireflection coating, the outermost layer of the antireflection coating, or interleaved between two alternated layers.

As used herein, a low refractive index layer is intended to mean a layer with an index of refraction lower than 1.55, preferably lower than 1.50 and even better lower than 1.45, and a high refractive index layer is intended to mean a layer with an index of refraction higher than 1.55, preferably higher than 1.7, more preferably higher than 1.8 and even better higher than 2, both at a referenced wavelength of 550 nm.

In a preferred embodiment, the inventive electrically conductive layer is adjacent to a HI layer of a multilayer AR stack.

In another preferred embodiment, the outermost layer of the antistatic AR stack is a low refractive index layer.

Preferably, layers of the AR stack have to be made of transparent materials.

HI layers may be made of, without limitation, $TiO_2$, $ZrO_2$, $Nb_2O_5$, $Y_2O_3$, $HfO_2$, $Sc_2O_3$, $Ta_2O_5$, $Pr_2O_3$, $Al_2O_3$, $Si_3N_4$, as well as mixtures thereof.

LI layers may be made of, without limitation, $SiO_2$, $MgF_2$, or mixtures thereof, preferably $SiO_2$.

In a preferred embodiment, the inventive AR coating is a five layer coating comprising one electrically conductive layer and four alternating Hi and LI layers. Said electrically conductive layer is preferably an inside layer, more preferably the fourth layer of the AR stack starting from the innermost layer of this stack.

The inventive electrically conductive layer used in the present invention is a metallic layer containing at least one metal, preferably selected from the group comprising gold, silver, platinum and mixtures thereof. More preferably, said metallic layer consists in silver, gold, platinum or mixtures thereof, preferably silver.

The electrically conductive layer is a thin layer having a thickness lower than or equal to 1 nm, preferably lower than or equal to 0.50 nm, more preferably lower than or equal to 0.30 nm, and even better ranging from 0.10 nm to 0.20 nm. Such a low thickness allows achieving the desired transparency.

Said metallic layer can have a continuous structure or a discontinuous structure. Actually, said layer can be so thin that it may not form a continuous film, but may rather be formed of small dots of irregular shape linked between them to ensure electrical conductivity.

Surprisingly, despite the low thickness of the inventive electrically conductive layer, the antistatic AR coating provides sufficient electrical conductivity.

An advantage of the inventive coating is that since the electrically conductive layer is extremely thin, the properties of a pre-existing stack wherein it is incorporated will remained nearly unchanged. In other words, the electrically conductive layer of the invention is a kind of dummy layer on an optical point of view. In addition, it is not necessary to conceive new design stacks to render them conductive.

The present invention also relates to an optical article having two main faces, at least one which having an antireflection, antistatic transparent coating deposited thereon, said coating being such as described above.

An important feature of the antireflection, antistatic coating of the invention is that it is a transparent coating. Preferably, the antireflection, antistatic coating for an optical article is such that the optical article, when coated on both sides with said coating, has a luminous absorption due to the AR coating in the visible range of preferably 1% or less, more preferably less than 1%, and/or a transmission in the visible spectrum preferably higher than 95%. Preferably, both features are simultaneously satisfied.

The optical article to be coated with the AR coating of the present invention is a transparent optical article, preferably a lens, and more preferably an ophthalmic lens or lens blank.

Both main faces of the optical article may be coated with an antireflection, antistatic transparent coating according to the invention.

Herein, the term "lens" means an organic or inorganic glass lens, comprising a lens substrate which may be coated with one or more coatings of various natures.

When the optical article comprises one or more surface coatings, the term "to deposit a layer onto the optical article" means that a layer is deposited onto the outermost coating of the optical article.

The substrate may be made of mineral glass or organic glass, preferably organic glass. The organic glasses can be either thermoplastic materials such as polycarbonates and thermoplastic polyurethanes or thermosetting (cross-linked) materials such as diethylene glycol bis(allylcarbonate) polymers and copolymers (in particular CR 39® from PPG Industries), thermosetting polyurethanes, polythiourethanes, polyepoxides, polyepisulfides, poly(meth)acrylates and copolymers based substrates, such as substrates comprising (meth)acrylic polymers and copolymers derived from bisphenol-A, polythio(meth)acrylates, as well as copolymers thereof and blends thereof. Preferred materials for the lens substrate are polycarbonates and diethylene glycol bis(allylcarbonate) copolymers, in particular substrates made of polycarbonate.

The antistatic AR coating may be deposited onto a naked substrate or onto the outermost coating layer of the substrate if the substrate is coated with surface coatings.

According to the invention, the optical article may comprise a substrate coated with various coating layers, chosen from, without limitation, an impact-resistant coating (impact resistant primer), an abrasion- and/or scratch-resistant coating (hard coat), a polarized coating, a photochromic coating, a dyeing coating, and an anti-fouling top coat.

The antistatic AR coating is preferably deposited onto an impact-resistant coating or an abrasion- and/or scratch-resistant coating.

In one embodiment of the invention, at least one main surface of the lens substrate is coated with successively, starting from the surface of the lens substrate, an impact-resistant coating (impact resistant primer), an abrasion- and/or scratch-resistant coating (hard coat), the inventive anti-reflection coating and an anti-fouling top coat.

In another embodiment of the invention, at least one main surface of the lens substrate is coated with successively, starting from the surface of the lens substrate, an abrasion- and/or scratch-resistant coating (hard coat), the inventive anti-reflection coating and an anti-fouling top coat.

The impact-resistant primer coating which may be used in the present invention can be any coating typically used for improving impact resistance of a finished optical article. Also, this coating generally enhances adhesion, if present, of the scratch-resistant coating on the substrate of the finished optical article. By definition, an impact-resistant primer coating is a coating which improves the impact resistance of the finished optical article as compared with the same optical article but without the impact-resistant primer coating.

Typical impact-resistance primer coatings are (meth)acrylic based coatings and polyurethane based coatings. (Meth)acrylic based impact-resistant coatings are, among others, disclosed in U.S. Pat. Nos. 5,015,523 and 6,503,631 whereas thermoplastic and cross-linked based polyurethane resin coatings are disclosed inter alia, in Japanese Pat. Nos. 63-141001 and 63-87223, EP Pat. No. 0404111 and U.S. Pat. No. 5,316,791.

In particular, the impact-resistant primer coating according to the invention can be made from a latex composition such as a poly(meth)acrylic latex, a polyurethane latex or a polyester latex.

Among the preferred (meth)acrylic based impact-resistant primer coating compositions there can be cited polyethylene glycol(meth)acrylate based compositions such as, for example, tetraethylene glycoldiacrylate, polyethylene glycol (200) diacrylate, polyethylene glycol (400) diacrylate, polyethylene glycol (600) di(meth)acrylate, as well as urethane (meth)acrylates and mixtures thereof.

Preferably the impact-resistant primer coating has a glass transition temperature (Tg) of less than 30° C. Among the preferred impact-resistant primer coating compositions, there may be cited the acrylic latex commercialized under the name Acrylic latex A-639 by Zeneca and polyurethane latexes commercialized under the names W-240 and W-234 by Baxenden.

In a preferred embodiment, the impact-resistant primer coating may also include an effective amount of a coupling agent in order to promote adhesion of the primer coating to the optical substrate and/or to the scratch-resistant coating. The same coupling agents, in the same amounts, as for the scratch-resistant coating compositions described below, can be used with the impact-resistant coating compositions.

The impact-resistant primer coating composition can be applied onto the lens substrate using any classical method such as spin, dip, or flow coating.

The impact-resistant primer coating composition can be simply dried or optionally pre-cured before molding of the optical substrate. Depending upon the nature of the impact-resistant primer coating composition, thermal curing, UV-curing or a combination of both can be used.

Thickness of the impact-resistant primer coating, after curing, typically ranges from 0.05 to 30 μm, preferably 0.5 to 20 μm and more particularly from 0.6 to 15 μm, and even better 0.6 to 5 μm.

Any known optical abrasion- and/or scratch-resistant coating composition can be used to form the abrasion- and/or scratch-resistant coating of the invention. Thus, the abrasion- and/or scratch-resistant coating composition can be a UV and/or a thermal curable composition.

By definition, an abrasion- and/or scratch-resistant coating is a coating which improves the abrasion- and/or scratch-resistance of the finished optical article as compared to a same optical article but without the abrasion- and/or scratch-resistant coating. Preferred coating compositions are (meth)acrylate based coatings. The term (meth)acrylate means either methacrylate or acrylate.

The main component of the (meth)acrylate based coating compositions may be chosen from monofunctional (meth)acrylates and multifunctional (meth)acrylates such as difunctional (meth)acrylates; trifunctional (meth)acrylates; tetrafunctional (meth)acrylates, pentafunctional(meth)acrylates, hexafunctional (meth)acrylates.

Examples of monomers which may be used as main components of (meth)acrylate based coating compositions are:
  Monofunctional (meth)acrylates: Allyl methacrylate, 2-ethoxyethyl acrylate, 2-ethoxyethyl methacrylate, caprolactone acrylate, isobornyl methacrylate, lauryl methacrylate, polypropylene glycol monomethacrylate.
  Difunctional (meth)acrylates: 1,4-butanediol diacrylate, 1,6-hexanediol diacrylate, 1,6-hexanediol dimethacrylate, polyethylene glycol diacrylate, tetraethylene glycol diacrylate, polyethylene glycol dimethacrylate, polyethylene glycol diacrylate, ethoxylated bisphenol A diacrylate, tetraethylene glycol diacrylate, tripropylene glycol diacrylate, neopentyl glycol diacrylate, 1,4-butanediol dimethacrylate, tetraethylene glycol dimethacrylate, diethylene glycol diacrylate.
  Trifunctional (meth)acrylates: Trimethylolpropane trimethacrylate, Trimethylolpropane triacrylate, pentaerythritol triacrylate, ethoxylated trimethylolpropane triacrylate, trimethylolpropane trimethacrylate.
  Tetra to hexa(meth)acrylates: Dipentaerythritol pentaacrylate, pentaerythritol tetraacrylate, ethoxylated pentaerythritol tetraacrylate, pentaacrylate esters.

Other preferred abrasion- and/or scratch-resistant coatings are silicon containing coatings, especially those obtained by curing a precursor composition including silanes or a hydrolyzate thereof, preferably epoxysilanes, and more preferably the epoxyalkoxysilanes disclosed in FR 2702486 (EP 0614957), WO 94/10230, U.S. Pat. Nos. 4,211,823 and 5,015,523.

A particularly preferred composition for an abrasion- and/or scratch-resistant coating is disclosed in FR 2702486. Said preferred composition comprises a hydrolyzate of an epoxytrialkoxysilane and dialkyldialkoxysilane, colloidal mineral fillers and a catalytic amount of an aluminum-based curing catalyst, the remaining of the composition being essentially comprised of solvents typically used for formulating these compositions.

Especially preferred epoxyalkoxysilane based abrasion- and/or scratch-resistant coating compositions are those comprising as the main constituents an hydrolyzate of γ-glycidoxypropyl-trimethoxysilane (GLYMO) as the epoxytrialkoxysilane component, an hydrolyzate of dimethyl-diethoxysilane (DMDES) as the dialkyldialkoxysilane component, colloidal silica and a catalytic amount of aluminum acetylacetonate.

In order to improve the adhesion of the abrasion- and/or scratch-resistant coating to the impact-resistant primer coating, an effective amount of at least one coupling agent can be added to the abrasion- and/or scratch-resistant coating composition. The preferred coupling agent is a pre-condensed solution of an epoxyalkoxysilane and an unsaturated alkoxysilane, preferably comprising a terminal ethylenic double bond.

Examples of epoxyalkoxysilanes are GLYMO, γ-glycidoxypropyl-pentamethyldisiloxane, γ-glycidoxypropyl-methyl-diisopropenoxysilane, γ-glycidoxypropyl-methyl-diethoxysilane, γ-glycidoxypropyl-dimethyl-ethoxysilane, γ-glycidoxypropyl-diisopropyl-ethoxysilane and γ-glycidoxypropyl-bis (trimethylsiloxy) methylsilane. The preferred epoxyalkoxysilane is GLYMO.

The unsaturated alkoxysilane can be a vinylsilane, an allylsilane, an acrylic silane or a methacrylic silane.

Examples of vinylsilanes are vinyltris (2-methoxyethoxy) silane, vinyltrisisobutoxysilane, vinyltri-tert-butoxysilane, vinyltriphenoxysilane, vinyltrimethoxysilane, vinyltriisopropoxysilane, vinyltriethoxysilane, vinyltriacetoxysilane, vinylmethyidiethoxysilane, vinylmethyldiacetoxysilane, vinylbis (trimethylsiloxy) silane and vinyidimethoxyethoxysilane.

Examples of allylsilanes are allyltrimethoxysilane, alkyltriethoxysilane and allyltris (trimethylsiloxy)silane.

Examples of acrylic silanes are 3-acryloxypropyltris (trimethylsiloxy) silane, 3-acryloxy-propyl-trimethoxysilane, acryloxy-propylmethyl-dimethoxy-silane, 3-acryloxypropyl-methylbis (trimethylsiloxy) silane, 3-acryloxypropyldimethylmethoxysilane, N-(3-acryloxy-2-hydroxypropyl)-3-aminopropyl-triethoxysilane.

Examples of methacrylic silanes are 3-methacryloxypropyltris (vinyldimethoxylsiloxy) silane, 3-methacryloxypropyltris (trimethylsiloxy) silane, 3-methacryloxypropyltris (methoxyethoxy) silane, 3-methacryloxy-propyl-trimethoxysilane, 3-methacryloxypropyl-pentamethyl-disiloxane, 3-meth-acryloxy-propyl-methyldimethoxysilane, 3-methacryloxy-propylmethyl-diethoxy-silane, 3-methacryloxypropyl-dimethyl-methoxysilane, 3-methacryloxy-propyl-dimethylethoxysilane, 3-methacryloxy-propenyl-trimethoxy-silane and 3-methacryloxy-propylbis (trimethylsiloxy) methylsilane.

The preferred silane is acryloxypropyl-trimethoxysilane.

Preferably, the amounts of epoxyalkoxysilane(s) and unsaturated alkoxysilane(s) used for the coupling agent preparation are such that the weight ratio:

$$R = \frac{\text{weight of epoxyalkoxysilane}}{\text{weight of unsaturated alkoxysilane}}$$

verifies the condition $0.8 \leq R \leq 1.2$.

The coupling agent preferably comprises at least 50% by weight of solid material from the epoxyalkoxysilane(s) and unsaturated alkoxysilane(s) and more preferably at least 60% by weight. The coupling agent preferably comprises less than 40% by weight of liquid water and/or organic solvent, more preferably less than 35% by weight.

The expression "weight of solid material from epoxyalkoxy silanes and unsaturated alkoxysilanes" means the theoretical dry extract from those silanes which is the calculated weight of unit $Q_k \text{Si O}_{(4-k)/2}$ where Q is the organic group that bears the epoxy or unsaturated group and $Q_k \text{Si O}_{(4-k)/2}$ comes from $Q_k \text{Si R'O}_{(4-k)}$ where Si—R' reacts to form Si—OH on hydrolysis. k is an integer from 1 to 3 and is preferably equal to 1. R' is preferably an alkoxy group such as $OCH_3$.

The water and organic solvents referred to above come from those which have been initially added in the coupling agent composition and the water and alcohol resulting from the hydrolysis and condensation of the alkoxysilanes present in the coupling agent composition.

Preferred preparation methods for the coupling agent comprise:
 1) mixing the alkoxysilanes
 2) hydrolyzing the alkoxysilanes, preferably by addition of an acid, such a hydrochloric acid
 3) stirring the mixture
 4) optionally adding an organic solvent
 5) adding one or several catalyst(s) such as aluminum acetylacetonate
 6) Stirring (typical duration: overnight).

Typically, the amount of coupling agent introduced in the scratch-resistant coating composition represents 0.1 to 15% by weight of the total composition weight, preferably 1 to 10% by weight.

The abrasion- and/or scratch-resistant coating composition can be applied onto the impact-resistant primer coating using any classical method such as spin, dip or flow coating.

The abrasion- and/or scratch-resistant coating composition can be simply dried or optionally pre-cured before application of a subsequent anti-reflection coating. Depending upon the nature of the abrasion- and/or scratch-resistant coating composition, thermal curing, UV-curing or a combination of both can be used.

Thickness of the abrasion- and/or scratch-resistant coating, after curing, usually ranges from 1 to 15 µm, preferably from 2 to 6 µm, preferably from 3 to 5 µm.

Preferably, the surface of the abrasion- and/or scratch-resistant coating is subjected to a corona treatment or a vacuum plasma treatment, in order to increase adhesion of the antistatic AR coating to be deposited.

The layer of anti-fouling top coat which may be used in the present invention is a low surface energy top coat. It may be deposited onto at least part of the inventive AR coating, preferably onto the entire surface of said coating.

The anti-fouling top coat is defined as a hydrophobic and/or oleophobic surface coating. The ones preferably used in this invention are those which reduce surface energy of the article to less than 20 mJ/m². The invention has a particular interest when using anti-fouling top coats having a surface energy of less than 14 mJ/m² and even better less than 12 mJ/m².

The surface energy values referred above are calculated according to Owens Wendt method, described in the following document: Owens, D. K.; Wendt, R. G. "Estimation of the surface force energy of polymers", *J. Appl. Polym. Sci.* 1969, 51, 1741-1747.

The anti-fouling top coat according to the invention is preferably of organic nature. By organic nature, it is meant a layer which is comprised of at least 40% by weight, preferably at least 50% by weight of organic materials, relative to the total weight of the coating layer. A preferred anti-fouling top coat is made from a liquid coating material comprising at least one fluorinated compound.

Hydrophobic and/or oleophobic surface coatings most often comprise silane-based compounds bearing fluorinated groups, in particular perfluorocarbon or perfluoropolyether group(s). By way of example, silazane, polysilazane or silicone compounds are to be mentioned, comprising one or more fluorine-containing groups such as those mentioned here above. Such compounds have been widely disclosed in the previous art, for example in U.S. Pat. No. 4,410,563, EP 0203730, EP 749021, EP 844265 and EP 933377.

A classical method to form an anti-fouling top coat consists in depositing compounds bearing fluorinated groups and Si—R groups, R representing an —OH group or a precursor thereof, such as —Cl, —NH₂, —NH— or —O-alkyl, preferably an alkoxy group. Such compounds may perform, at the surface onto which they are deposited, directly or after hydrolysis, polymerization and/or cross-linking reactions with pendent reactive groups.

Preferred fluorinated compounds are silanes and silazanes bearing at least one group selected from fluorinated hydrocarbons, perfluorocarbons, fluorinated polyethers such as $F_3C$—$(OC_3F_6)_{24}$—O—$(CF_2)_2$—$(CH_2)_2$—O—$CH_2$—Si $(OCH_3)_3$ and perfluoropolyethers, in particular perfluoropolyethers.

Among fluorosilanes there may be cited the compounds of formulae:

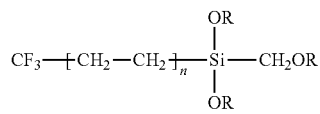

wherein n=5, 7, 9 or 11 and R is an alkyl group, typically a $C_1$-$C_{10}$ alkyl group such as methyl, ethyl and propyl;

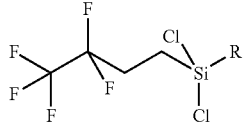

$CF_3CH_2CH_2SiCl_3$; $CF_3-CF_2-(CH_2CH_2)_{n'}-SiCl_3$; and

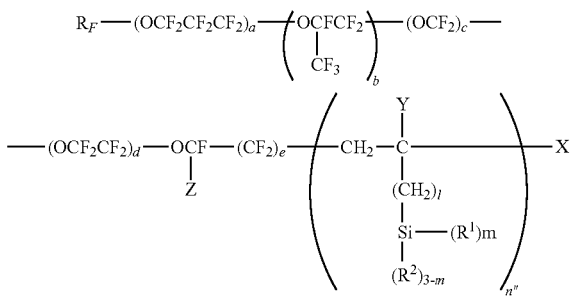

wherein n'=7 or 9 and R is as defined above.

Compositions containing fluorosilanes compounds also useful for making hydrophobic and/or oleophobic top coats are disclosed in U.S. Pat. No. 6,183,872. Such compositions comprise silicon-containing organic fluoropolymers represented by the below general formula and having a number average molecular weight of from $5 \times 10^2$ to $1 \times 10^5$.

$$R_F-(OCF_2CF_2CF_2)_a-\left(OCFCF_2\atop{|\atop CF_3}\right)_b-(OCF_2)_c-$$
$$-(OCF_2CF_2)_d-OCF-(CF_2)_e-\left(CH_2-C\atop{|\atop Z}\atop{\begin{array}{c}Y\\|\\(CH_2)_l\\|\\Si-(R^1)m\\|\\(R^2)_{3-m}\end{array}}\right)_{n''}-X$$

wherein $R_F$ represents a perfluoroalkyl group, Z represents a fluorine atom or a trifluoromethyl group, a, b, c, d and e each independently represent 0 or an integer equal to or higher than 1, provided that a+b+c+d+e is not less than 1 and the order of the repeating units parenthesized by subscripts a, b, c, d and e occurring in the above formula is not limited to that shown; Y represents a hydrogen atom or an alkyl group containing 1 to 4 carbon atoms; X represents a hydrogen, bromine or iodine atom; $R^1$ represents a hydroxyl group or a hydrolyzable substituent group; $R^2$ represents a hydrogen atom or a monovalent hydrocarbon group; l represents 0, 1 or 2; m represents 1, 2 or 3; and n" represents an integer equal to or higher than 1, preferably equal to or higher than 2.

Other preferred compositions for forming the hydrophobic and/or oleophobic surface coating are those containing compounds comprising fluorinated polyether groups, in particular perfluoropolyether groups. A particular preferred class of compositions containing fluorinated polyether groups is disclosed in U.S. Pat. No. 6,277,485. The anti-fouling top coats of U.S. Pat. No. 6,277,485 are at least partially cured coatings comprising a fluorinated siloxane prepared by applying a coating composition (typically in the form of a solution) comprising at least one fluorinated silane of the following formula:

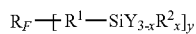

wherein $R_F$ is a monovalent or divalent polyfluoro polyether group; $R^1$ is a divalent alkylene group, arylene group, or combinations thereof, optionally containing one or more heteroatoms or functional groups and optionally substituted with halide atoms, and preferably containing 2 to 16 carbon atoms; $R^2$ is a lower alkyl group (i.e., a $C_1$-$C_4$ alkyl group); Y is a halide atom, a lower alkoxy group (i.e., a $C_1$-$C_4$ alkoxy group, preferably, a methoxy or ethoxy group), or a lower acyloxy group (i.e., —OC(O)$R^3$ wherein $R^3$ is a $C_1$-$C_4$ alkyl group); x is 0 or 1; and y is 1 ($R_F$ is monovalent) or 2 ($R_F$ is divalent). Suitable compounds typically have a molecular weight (number average) of at least about 1000. Preferably, Y is a lower alkoxy group and $R_F$ is a perfluoro polyether group.

Commercial compositions for making anti-fouling top coats are the compositions KY130 and KP 801M commercialized by Shin-Etsu Chemical and the composition OPTOOL DSX (a fluorine-based resin comprising perfluoropropylene moieties) commercialized by Daikin Industries. OPTOOL DSX is the most preferred coating material for anti-fouling top coats.

The liquid coating material for forming the anti-fouling top coat of the invention may comprise one or more of the above cited compounds. Preferably, such compounds or mixtures of compounds are liquid or can be rendered liquid by heating, thus being in a suitable state for deposition.

The deposition techniques for such anti-fouling top coats are very diverse, including liquid phase deposition such as dip coating, spin coating (centrifugation), spray coating, or vapor phase deposition (vacuum evaporation). Of which, deposition by spin or dip coating is preferred.

If the anti-fouling top coat is applied under a liquid form, at least one solvent is added to the coating material so as to prepare a liquid coating solution with a concentration and viscosity suitable for coating. Deposition is followed by curing.

In this connection, preferred solvents are fluorinated solvents and alcanols such as methanol, preferably fluorinated solvents. Examples of fluorinated solvents include any partially or totally fluorinated organic molecule having a carbon chain with from about 1 to about 25 carbon atoms, such as fluorinated alkanes, preferably perfluoro derivatives and fluorinated ether oxides, preferably perfluoroalkyl alkyl ether oxides, and mixtures thereof. As fluorinated alkanes, perfluorohexane ("Demnum" from DAIKIN Industries) may be used. As fluorinated ether oxides, methyl perfluoroalkyl ethers may be used, for instance methyl nonafluoro-isobutyl ether, methyl nonafluorobutyl ether or mixtures thereof, such as the commercial mixture sold by 3M under the trade name HFE-7100. The amount of solvent in the coating solution preferably ranges from 80 to 99.99% in weight.

The present invention also relates to a method of manufacturing the above described optical article, comprising the steps of:

providing an optical article having two main faces, forming on at least one main face of said optical article an antireflection, antistatic transparent coating comprising at least one electrically conductive layer, wherein said electrically conductive layer contains at least one metal and has a thickness lower than or equal to 1 nm.

The electrically conductive layer is preferably deposited by vacuum evaporation of a metal source, while the other layers of the AR stack, which can be called "the anti-reflection layers" and are typically HI and LI layers, may be deposited by conventional deposition techniques well known by the person skilled in the art.

Said anti-reflection layers can be applied in particular by vacuum deposition according to one of the following techniques:

1)—by evaporation, optionally ion beam-assisted;
2)—by spraying using an ion beam;
3)—by cathode sputtering; or
4)—by plasma-assisted vapor-phase chemical deposition.

The process of the invention can be used for manufacturing ophthalmic lenses coated on their convex main side (front side), concave main side (back side), or both sides.

The process of the invention presents many advantages. For example, its implementation requires no modification of the original tweaking of the traditional process for depositing an AR coating, no modification of the deposition apparatus, no various additional equipments. The step of depositing one metallic layer according to the invention only requires around 1 minute and consequently has no big effect on total process time compared to the traditional process. In addition, the inventive process consumes very low amounts of metal, especially silver.

The invention is further illustrated by the examples described below. These examples are meant to illustrate the invention and are not to be interpreted as limiting the scope of the invention.

EXAMPLES

An AR antistatic coating is deposited onto two ophthalmic lenses made of ORMA® having a power of −2.00 diopters (a range of −8.00-+8.00 diopters is possible). ORMA® is a registered trade mark of Essilor. This material is obtained by polymerizing a diethylene glycol bis(allyl carbonate), typically CR39®. The two lenses have two different surface coatings.

Preparation of Lens N° 1

A primer polyurethane coating of around 1 μm is deposited on both surfaces (convex side (CX) and concave side (CC)) of the lens substrate. Then both surfaces are coated with a polysiloxane anti-abrasion coating.

The anti-abrasion coating is obtained by deposition and curing of a composition comprising, by weight, 224 parts of GLYMO (γ-glycidoxypropyltrimethoxysilane), 80.5 parts of 0.1 N HCl, 120 parts of dimethyldiethoxysilane, 718 parts of colloidal silica 30% by weight in methanol, 15 parts of aluminum acetylacetonate and 44 parts of ethylcellosolve. The composition also comprises 0.1% by weight/per total weight of the composition of surfactant FLUORAD FC 430 of 3M.

Preparation of Lens N° 2

Lens N° 2 is the same lens as lens N° 1 except that there is no primer coating, the anti-abrasion coating being deposited directly onto the lens substrate.

Preparation of an Ophthalmic Lens Equipped with an Antistatic AR Coating According to the Invention An antistatic AR stack was deposited on each of the two lenses above on both faces, followed by a thin layer of the fluorinated antifouling top coat described in U.S. Pat. No. 6,183,872, so as to obtain the following stacks:

| Lens N° 1 | Lens N° 2 |
|---|---|
| Substrate | Substrate |
| Primer coating | Anti-abrasion coating |
| Anti-abrasion coating | $ZrO_2$ (12-40 nm) |
| $ZrO_2$ (12-40 nm) | $SiO_2$ (19-37 nm) |
| $SiO_2$ (19-37 nm) | $ZrO_2$ (70-125 nm) |
| $ZrO_2$ (70-125 nm) | Ag (0.2 nm) |
| Ag (0.2 nm) | $SiO_2$ (60-120 nm) |
| $SiO_2$ (60-120 nm) | Anti-fouling top coat |
| Anti-fouling top coat | Air |
| Air | |

The deposition apparatus employed was a SATIS 900 or BAK760 coater. The deposition parameters of the $ZrO_2$ and $SiO_2$ layers are classical and well known by the person skilled in the art. An ion bombardment was implemented on the $ZrO_2$ surface after its deposition and before deposition of the silver layer.

The parameters of the deposition process of the silver layer are detailed hereafter:

The evaporation of the silver was made with an electron-beam gun. A specific liner made of molybdenum was designed for this material. This chemical was melted first in order to get a "cake". The obtained silver layer was very thin in order to avoid absorption.

The thickness displayed in the program was 20 Å. The right value was chosen in that range when transmission and antistatic performance were in specifications. A program thickness of 10-30 on the Satis 900 corresponds roughly to a thickness of 0.1-0.3 nm. The rate was 1 Å/s and very stable in spite of this low value.

Results

The obtained lenses showed that the thickness of the Ag layer being in the stack did not cause notable transmittance loss, as the visual transmittance of the lens optically coated on both sides was >95%, and generally >97% (97.2-97.8%), which is the range of standard antireflection-coated lenses.

Antistatic evaluation (static dissipation) of the two lenses described above having Ag layers with different thicknesses was made using a JCI unit, using different JCI initial voltages.

Besides, a qualitative comparative check also involved rubbing the lenses surface with a dry selvyt or cemoi cloth, and then checking if the lens picked up small shreds of paper (in which a non-antistatic lens normally would pick up and hold the shreds).

The results are presented in Table I.

TABLE I

Static dissipation measured on JCI unit and other characteristics of some Ag-containing stacks.

| | | | | CX | | CC | |
|---|---|---|---|---|---|---|---|
| Example | Optical article | Ag Thickness (nm) | Time before JCI. Test | JCI Initial voltage (V) | JCI Discharge time (s) | JCI Initial voltage (V) | JCI Discharge time (s) |
| 1 | Lens 2 | 0.2 | 1 day | −405 | 0.0289 | −391 | 0.0650 |
| 2 | Lens 1 | 0.2 | 1 day | −493 | 0.0313 | −361 | 0.0388 |
| 3 | Lens 2 | 0.2 | 1 day | −394 | 0.0311 | −384 | 0.0697 |
| 4 | Lens 1 | 0.2 | 1 day | −427 | 0.0359 | −323 | 0.0492 |

The quantitative JCI test revealed that the inventive antistatic AR coating allows achieving very low discharge times.

The qualitative test revealed that that the lenses of example 1 to 4 bearing the antistatic AR of the invention exhibited satisfactory AR properties since they did not pick up small shreds of paper after being rubbed with a dry Selvit or Cemoi cloth.

It is considered that the presence of the metallic layer in the AR stack effectively prevents appreciable electrostatic charge build-up by continuously discharging the charge.

It is to be understood that the present description and examples illustrate aspects of the invention relevant to a clear understanding of the invention. Certain aspects of the invention that would be apparent to those of ordinary skill in the art and that, therefore, would not facilitate a better understanding of the invention have not been presented in order to simplify the present description. Although the present invention has been described in connection with certain embodiments, the present invention is not limited to the particular embodiments or examples disclosed, but is intended to cover modifications that are within the spirit and scope of the invention, as defined by the appended claims.

The invention claimed is:

1. An antireflection, antistatic transparent coating for an optical article, comprising at least one electrically conductive metallic layer containing at least one metal selected from the group consisting of silver, gold, and platinum, wherein said at least one metallic layer has a thickness lower than or equal to 0.30 nm, and wherein said coating does not include an electrically conductive metallic layer that has a thickness greater than 1 nm.

2. The coating according to claim 1, wherein the electrically conductive metallic layer has a thickness ranging from 0.10 to 0.20 nm.

3. The coating according to claim 1, wherein the electrically conductive metallic layer consists of silver, gold, and/or platinum.

4. The coating according to claim 3, wherein the electrically conductive metallic layer consists of silver.

5. The coating according to claim 1, comprising a stack of alternated layers of high refractive index and low refractive index and at least one electrically conductive metallic layer, said at least one electrically conductive metallic layer being the innermost layer of the antireflection coating, the outermost layer of the antireflection coating, or interleaved between two alternated layers.

6. An optical article having two main faces, at least one of which having the antireflection, antistatic transparent coating of claim 1 deposited thereon.

7. The optical article according to claim 6, wherein the optical article is coated on both main faces with the coating.

8. The optical article according to claim 7, wherein the optical article has a luminous absorption due to the AR coating in the visible range of 1% or less.

9. The optical article according to claim 7, wherein the optical article has a transmission in the visible spectrum higher than 95%.

10. The optical article according to claim 6, further defined as an ophthalmic lens.

11. A method of manufacturing the optical article of claim 6, comprising:
providing an optical article having two main faces; and
forming on at least one main face of said optical article an antireflection, antistatic transparent coating comprising at least one electrically conductive metallic layer containing at least one metal selected from the group consisting of silver, gold, and platinum, wherein said at least one metallic layer has a thickness lower than or equal to 0.30 nm, and wherein said coating does not include an electrically conductive metallic layer that has a thickness greater than 1 nm.

12. A method according to claim 11, wherein the at least one electrically conductive layer is deposited by vacuum evaporation of a metal source.

13. The coating according to claim 1, wherein the electrically conductive metallic layer is a silver and/or gold layer.

14. The coating according to claim 1, wherein the coating comprises a single electrically conductive metallic layer.

15. The coating according to claim 1, wherein the at least one electrically conductive metallic layer is not adjacent to a second electrically conductive metallic layer.

* * * * *